UNITED STATES PATENT OFFICE.

CHARLES D. ROGERS, OF UTICA, NEW YORK, AND MONROE P. WILKINS, OF JERSEY CITY, NEW JERSEY, ASSIGNORS TO THE MANHATTAN BRUSH-MANUFACTURING COMPANY.

IMPROVEMENT IN THE METHODS OF HOLDING BRISTLES IN BRUSH-STOCKS.

Specification forming part of Letters Patent No. 70,270, dated October 29, 1867; reissue No. 4,459, dated July 4, 1871.

*To all whom it may concern:*

Be it known that we, CHARLES D. ROGERS, of Utica, Oneida county and State of New York, and MONROE P. WILKINS, of Jersey City, in the State of New Jersey, have invented certain new and useful Contrivances for Holding Bristles and other Fibers in Brush-Lags or Stocks; and the following, taken in connection with the drawing, is a full, clear, and exact description thereof.

In the drawing, Figure 1 is a section through a brush, exhibiting one modification of our invention. Figs. 2 and 3 are elevations and sections through bunches of bristles, and their ferrules and ferrule-flanges, and attaching contrivances. Fig. 4 is a section through a different modification of attaching contrivance with its ferrule and flange. Figs. 5 and 6 are elevations and sections of the same, with the bristles inserted; and Fig. 7 is a section through a brush, showing another modification of the invention with the bristles partially driven into the stock.

Prior to the date of our invention bristles or other fibers, whalebone, grasses, &c., have been secured in stocks by wires or pegs passed through loops in the bunch of bristles, as in ordinary hair, clothes, and tooth-brushes, &c. They have also been secured by applying a cylindrical ferrule without a flange around a bunch of bristles, and driving the ferrule and contained bristles into a cylindrical hole in a stock. Our invention, as in all modifications it employs a ferrule, may be considered as an improvement upon the latter mode of fastening; and in its most perfect form our invention includes two improvements upon the plain ferrule, viz.: 1st, a means of holding the bristles in the ferrule; 2d, a method of holding the ferrule in the stock, both more secure than the old mode, in which the ferrules were held in the stock and the bristles in the ferrule by simple friction. These improvements may be used separately, and for the sake of convenience we term the contrivances for holding the bristles in the ferrule attaching contrivances.

In the drawing the ferrule is represented as made with a flange, by preference, slightly dished or cupped like the flange of an ordinary eyelet. Into this ferrule bunches of bristles are to be inserted, filling the bore of the eyelet, and, by preference, in a looped state, as in an ordinary tooth-brush. When the ferrule is like an ordinary eyelet, as at *a a a*, a small wire staple or pin, *b b*, is to be passed through the loop, this pin being the attaching contrivance, and the whole is then to be driven into a cylindrical or tapering hole in the brush-stock, the flanges entering countersinks or shallow cylinders formed around the holes, as at *c c*. When the pin is staple-formed it will crush in the periphery of the eyelet or ferrule as the latter is driven, and thus pinch the bristles, holding them fast by friction as well as by the positive fastening of the pin in the loop, and the ferrule will be held in by friction of its periphery, and also by the edge of the flange spreading out against the circumference of the countersink, the latter effect being especially noticeable when the flange is dished, and is, by the act of driving, formed into a plane or a less dishing surface. In the place of the wire pin, peg, or staple, and as a substitute and equivalent for it, we sometimes intend to make the ferrule with small points or projections on its inner end, as at *d*, Fig. 4. These points are to be bent down into the loop of bristles, or among the ends of the bristles if no loop be used, as indicated in Figs. 5 and 6, and these ferrules and bristles are then to be driven into a hole in the stock.

Another modification of the attaching contrivance is shown at Fig. 7, where the ferrule is slit so as to form long points or prongs, and this form may be used most beneficially in combination with a tapering hole and without previous bending of the forks, prongs, or points into the loops of or between the ends of a bunch of bristles. As the ferrule is driven the prongs will embrace or enter among the fibers, or do both, and hold them firmly in the ferrule.

As before stated, the ferrules may be used without the flanges, and with the attaching contrivances, or without these and with flanges. The best plan is to use both. The most convenient tool for driving the ferrules and their contents and attachments into the stock is a pincher with a half-cylinder cut out of each jaw so as to embrace the bunch of bristles or other fibers, and handles so formed that they may be struck on their ends with a hammer.

We do not claim a ferrule surrounding bunches of bristles or other fibers and driven into a hole in a brush-stock; but What we do claim is—

1. A bunch of bristles in combination with a flanged ferrule, and these in combination with a hole or aperture and countersink in a brush-stock, substantially as described.

2. In combination, a ferrule, a bunch of bristles, and an attaching contrivance substantially such as described, the combination being substantially such as set forth; and also, these elements in combination with a hole in a brush-stock.

3. In combination, a flanged ferrule, an attaching contrivance, and a bunch of bristles, the combination being substantially such as described; and these, also, in combination with a hole and countersink in a brush-stock, the combination being substantially such as set forth.

4. A ferrule or eyelet having a portion or portions of its periphery bent or crushed into a bunch of bristles or fibers, or into the eye of a loop of bristles or fibers, as described, in combination with a brush-stock.

And we wish it distinctly understood that by the word "bristles" in all these claims we mean fibers, vegetable or animal, suitable for the formation of brushes.

CHARLES D. ROGERS.
M. P. WILKINS.

Witness to C. D. ROGERS' signature:
PETER F. HUGHES.
Witness to both signatures:
H. A. HARVEY.
Witness to M. P. WILKINS' signature:
C. E. HAMILTON.